United States Patent
Shau et al.

(10) Patent No.: US 6,238,279 B1
(45) Date of Patent: May 29, 2001

(54) MAGNETIC FILTRATION FOR SLURRY USED IN CHEMICAL MECHANICAL POLISHING OF SEMICONDUCTOR WAFERS

(75) Inventors: Feng-Yeu Shau, An-Ding Hsiang; Rurng-Chien Chang, Kao-Hsiung; Champion Yi, Hsinchu Hsien, all of (TW)

(73) Assignees: ProMOS Technologies, Inc.; Mosel Vitelic, Inc., both of Hsinchu (TW); Infineon Technologies AG, Muchen (DE)

( * ) Notice: Subject to any disclaimer, the term of this patent is extended or adjusted under 35 U.S.C. 154(b) by 0 days.

(21) Appl. No.: 09/326,145

(22) Filed: Jun. 3, 1999

(51) Int. Cl.⁷ ........................................................ B24B 7/00
(52) U.S. Cl. ................................ 451/446; 451/60; 451/93
(58) Field of Search ................................ 451/60, 446, 93; 209/213–214, 223.1–2, 223, 224

(56) References Cited
U.S. PATENT DOCUMENTS

| | | | |
|---|---|---|---|
| 2,652,925 | * 9/1953 | Vermeiren | 209/224 |
| 4,544,482 | * 10/1985 | Rupp | 210/222 |
| 4,595,494 | * 6/1986 | Kukuck | 209/224 |
| 4,678,119 | * 7/1987 | Doyle | 239/9 |
| 4,895,647 | * 1/1990 | Uchiyama | 210/171 |
| 5,470,466 | * 11/1995 | Schaaf | 210/222 |
| 5,667,074 | * 9/1997 | Reali et al. | 209/224 |
| 5,740,919 | * 4/1998 | Stowe | 209/223.1 |
| 6,015,499 | * 1/2000 | Hayden | 210/767 |
| 6,106,714 | * 8/2000 | Chiu et al. | 210/321.63 |

* cited by examiner

Primary Examiner—Joseph J. Hall, III
Assistant Examiner—George Nguyen
(74) Attorney, Agent, or Firm—Blakely, Sokoloff, Taylor & Zafman LLP

(57) ABSTRACT

A method and apparatus for filtering a slurry used in a chemical mechanical polishing apparatus is disclosed. Magnets are provided along the piping network between a slurry reservoir and the CMP apparatus. A magnet may also be placed adjacent to the slurry reservoir to prevent iron oxide particles from traveling with the slurry to the CMP apparatus. The magnets attract iron oxide particles from the slurry and remove those particles from the slurry prior to polishing. This reduces the amount of defects caused by the iron oxide particles in the slurry.

7 Claims, 1 Drawing Sheet

MAGNETIC FILTRATION FOR SLURRY USED IN CHEMICAL MECHANICAL POLISHING OF SEMICONDUCTOR WAFERS

FIELD OF THE INVENTION

The present invention relates to slurries used in chemical mechanical polishing, and more particularly, to a method for purifying the slurry using magnetic filtration.

BACKGROUND OF THE INVENTION

Chemical mechanical polishing is one of the many steps commonly used in the manufacture of integrated circuits. As detailed in many prior art patents, chemical mechanical polishing, or simply "CMP," is the process of polishing the surface of a semiconductor wafer in order to remove material from the surface of the wafer. The polishing is typically performed by rotating a polishing pad against the semiconductor wafer. A slurry of some sort is used to facilitate the polishing process. Depending upon the material that is to be removed from the semiconductor wafer, the composition of the polishing pad and the composition of the slurry varies.

For example, in the CMP of tungsten material from the surface of a wafer, the slurry will include an oxidizer, which is typically ferric nitrate crystals ($Fe(NO_3)_3$). The ferric nitrate crystals are usually diluted in deionized water and then mixed with aluminum oxide ($Al_2O_3$) before being introduced into the CMP apparatus. Examples of slurry compositions are detailed in U.S. Pat. No. 5,783,489 to Kaufman et al. and the patents cited therein.

Typically, before the slurry enters the CMP apparatus, a physical filter is used to remove any large particles that may scratch the surface of the wafer. Nevertheless, even with this filtering, defects caused by particles are found on the surface of the semiconductor wafer. These defects can result in short circuiting of metal interconnect layers. The defects may be singular or may be of the "skipping stone" type.

It is theorized that the root cause of this defect mechanism is the formation of iron oxide in the slurry. It is believed that the iron oxide is generated from the raw ferric nitrate material itself. In other words, due to the nature of ferric nitrate manufacturing, iron oxide is easily formed during the precipitation process. These impurities are specified as "insoluble material" in the product content table. Some of these particles may escape the physical filter and reach the wafer surface.

It is also believed that the ferric nitrate may be decomposed and oxidized into iron oxide and accumulate on piping that leads from the slurry reservoir to the CMP apparatus. After some amount of sedimentation and agglomeration, the iron oxide releases from the piping wall and reaches the CMP apparatus and the wafer surface. The decomposition may result from a change in pH level, heat, light, and other particle interaction.

As noted above, the iron oxide particles may be partially removed by physical filtration. However, this method can be prohibitively costly as the fineness of the physical filter decreases. The iron oxide deposited on the piping wall downstream from the physical filtering cannot be removed by the filters and will require either frequent pipe changing or chemical cleaning.

Therefore, what is needed is a method of removing the iron oxide particles from the slurry.

SUMMARY OF THE INVENTION

A method and apparatus for filtering a slurry used in a chemical mechanical polishing apparatus is disclosed. Magnets are provided along the piping network between a slurry reservoir and the CMP apparatus. A magnet may also be placed adjacent to the slurry reservoir to prevent iron oxide particles from traveling with the slurry to the CMP apparatus. The magnets attract iron oxide particles from the slurry and remove those particles from the slurry prior to polishing. This reduces the amount of defects caused by the iron oxide particles in the slurry.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
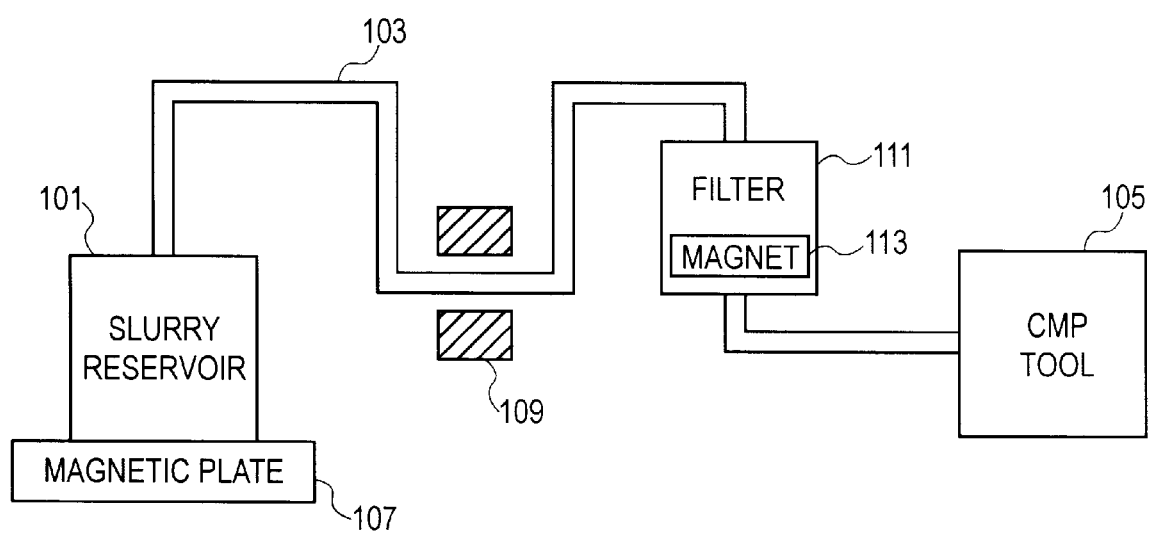
FIG. 1 illustrates in the preferred embodiment of the present invention.

As noted above, it is believed that iron oxide particles (also called magnetite or ferrosoferric oxide) cause defects to be formed on the semiconductor wafer during the polishing process. Thus, the goal of the present invention is to remove the iron oxide material from the slurry. Although extremely fine mesh physical filters may be used to filter the iron oxide particles, because the particles can be extremely small, the filtering may be ineffective, or may be cost-prohibitive. Therefore, the present invention provides a method for reducing or eliminating the amount of iron oxide particles in the slurry delivered to the CMP apparatus.

Turning to FIG. 1, a slurry reservoir 101 is shown. The slurry reservoir provides slurry through a piping system 103 to a CMP tool 105. The slurry reservoir 101, the piping system 103, and the CMP tool 105 are of conventional design.

In accordance with the present invention, a magnetic plate 107 is placed under the slurry reservoir. The magnetic plate 107 may be a permanent magnet or an electromagnet and preferably provides a magnetic field of sufficient strength to attract the iron oxide particles. It can be appreciated that the field strength will be dependent upon the system parameters and most likely will have to be adjusted to a particular CMP system. When activated (in the case of an electromagnet), the magnetic plate 107 serves to attract the iron oxide in the slurry contained in the slurry reservoir 101. Preferably, the magnetic plate 107 is located underneath the slurry reservoir 101 so as to attract the iron oxide to the bottom of the slurry reservoir. This is preferable if the outgoing piping system 103 takes the slurry from the top of the slurry reservoir 101. In any event, it is preferable to attract the iron oxide to a location that is away from the intake to the piping system 103.

In addition, magnetic devices can also be put along various locations of the piping system 103. In particular, an external magnet 109 can be placed in regions of the piping 103 that bend or have corners. This provides a magnetic field that attracts the iron oxide particles against the pipe wall and will tend to maintain the iron oxide particles along the pipe wall. Furthermore, pipe connectors 112 are provided on either end of the piping 103 that passes through the external magnet 109. These pipe connectors 112 are of standard design and are intended to allow easy replacement of the piping 103 that passes through the external magnet 109. Thus, as the piping 103 within the external magnet 109 begins to accumulate iron oxide particles, the piping may be replaced periodically.

The external magnet 109 can either be a fixed magnet or an electromagnet that generates a magnetic field of sufficient strength to attract the iron oxide particles. As noted above, it can be appreciated that the field strength will be dependent upon the system parameters and most likely will have to be adjusted to a particular CMP system. It can further be appreciated that external magnets can be placed throughout the entire length of the piping 103 or at any other position along the piping 103.

Finally, placed within the piping 103 is a physical filter 111. The physical filter 111 is also of conventional design in the prior art and is typically used for filtering particles out of the slurry. In another preferred embodiment of the present invention, a magnet 113 is placed within and integrated with the filter 111 to aid the filtering process so that the iron oxide is attracted to the magnets installed within the filter housing.

It has been found that the use of magnetic filtration in accordance with the present invention significantly reduces the amount of iron oxide in the slurry delivered to the CMP tool 105.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of reducing particles in a slurry for use in a chemical mechanical polishing process, the method comprising the step of:

providing a magnet adjacent to a slurry reservoir, said slurry reservoir holding said slurry, wherein said magnet producing a magnetic field that penetrates said slurry reservoir to filter particles in said slurry.

2. The method of claim 1 further including the step of providing a magnet along at least a portion of a piping system that carries said slurry from said slurry reservoir to a CMP tool.

3. The method of claim 1 further comprising the step of providing a magnet within a physical filter, said physical filter placed along said piping network.

4. A slurry delivery system for delivering slurry to a chemical mechanical polishing tool, the system comprising:

a slurry reservoir for holding a volume of slurry;

a piping system for delivering said slurry to said chemical mechanical polishing tool; and a magnet located adjacent to said slurry reservoir so as to provide a magnetic field that penetrates said slurry reservoir to filter particles in said slurry.

5. The system of claim 4 further including a piping magnet located adjacent to at least a portion of said piping system, said piping magnet producing a magnetic field that penetrates said piping system.

6. The system of claim 4 further including a physical filter located along said piping system, said physical filter including a filter magnet that produces a magnetic field that extends through said slurry.

7. The system of claim 5 further including pipe connectors located at both ends of said at least a portion of said piping system, said pipe connectors providing removal and replacement of said at least a portion of said piping system.

* * * * *